United States Patent [19]

Ise et al.

[11] Patent Number: 4,675,668

[45] Date of Patent: Jun. 23, 1987

[54] DATA TRANSMISSION SYSTEM OVER BUILDING WIRING

[75] Inventors: Masahiro Ise, Kashihara; Hidehiko Tanaka, Tenri; Katsuyuki Machino, Nara; Toshiyuki Matsubara; Teiji Terasaka, both of Tenri, all of Japan

[73] Assignee: Sharp Kabushiki Kaisha, Osaka, Japan

[21] Appl. No.: 818,068

[22] Filed: Jan. 13, 1986

Related U.S. Application Data

[63] Continuation of Ser. No. 454,623, Dec. 30, 1982, abandoned.

[51] Int. Cl.⁴ .............................................. H04H 1/00
[52] U.S. Cl. ........................... 340/825.08; 340/825.18; 340/310 R
[58] Field of Search ........ 340/310 R, 310 A, 310 CP, 340/825.08, 825.18, 825.52; 375/3, 4; 179/170 J; 178/70 R; 455/14; 370/88

[56] References Cited

U.S. PATENT DOCUMENTS

| | | | |
|---|---|---|---|
| 3,731,002 | 5/1973 | Pierce | 370/88 |
| 4,210,901 | 7/1980 | Whyte et al. | 340/310 R |
| 4,250,489 | 2/1981 | Dudash et al. | 340/310 A X |
| 4,357,598 | 11/1982 | Melvin, Jr. | 375/4 X |
| 4,427,968 | 1/1984 | York | 340/310 R |
| 4,475,209 | 10/1984 | Udren | 340/310 R X |

Primary Examiner—Ulysses Weldon
Attorney, Agent, or Firm—Birch, Stewart, Kolasch & Birch

[57] ABSTRACT

A data transmission method over building wiring includes a plurality of transmission sections. One of these sections is selected from the plurality of transmission sections to be a data transmission source machine for providing data. The data is transmitted from the data transmission source to the remaining transmission sections. If a transmission section is not selected it is used to relay the data to one of the remaining transmission sections wherein it is received by a final data transmission section. A data transmission section used in the method, comprises a data receiving part for receiving the transmitted data, a relay counter part for counting the number of relaying the transmitted data, and data relaying part for steps of relaying the-received data.

3 Claims, 11 Drawing Figures

DATA FORMAT

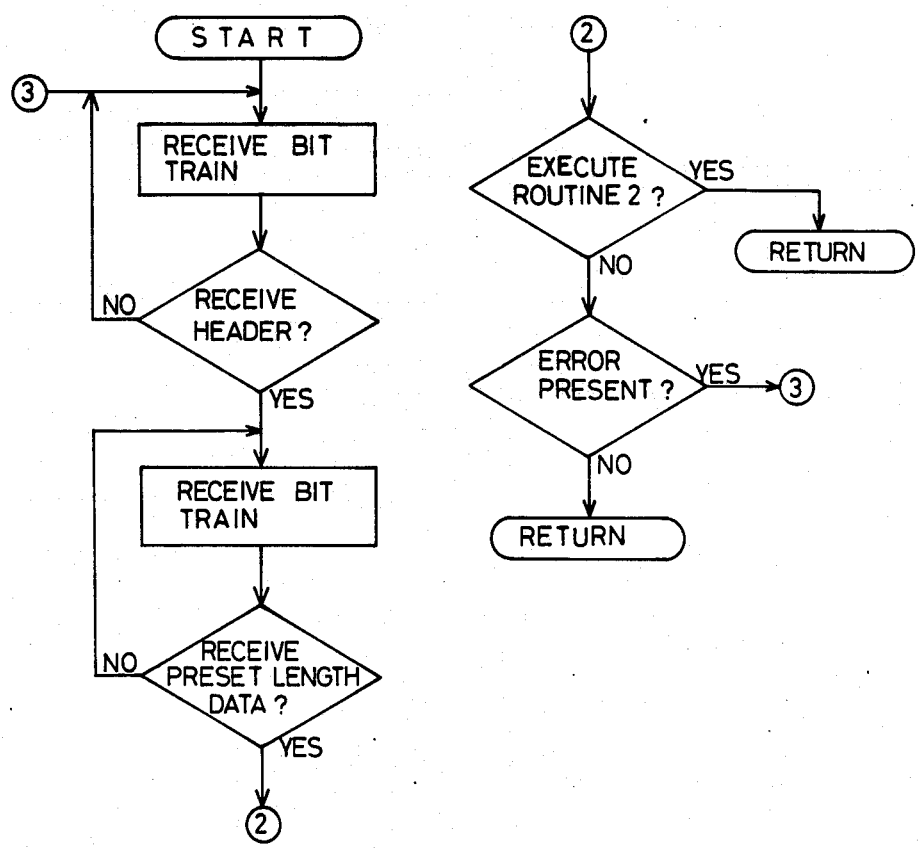
FIG.6(c) DATA RECEIVING ROUTINES 1 AND 2

DATA TRANSMISSION SYSTEM OVER BUILDING WIRING

This application is a continuation of application Ser. No. 454,623 filed on Dec. 30, 1982 now abandoned.

BACKGROUND OF THE INVENTION

The present invention relates to a data transmission system over a building or house and, more particularly, to such a data transmission system using a polling system.

It is known in the art that a data transmission system can be suitable for use as a gas central monitoring system etc. over a building or house. Any central monitoring system comprises a plurality of sensors and actuators, which are spread over the building or house. Data developed from the sensors and the actuators are gathered and provided to a central machine to develop any necessary alarm. For a reduction of cost, the data should be superimposed on a power line.

However, a fluorescent lamp with a condenser for improving power factor or a high power electric heater may be connected to the power line. Such a lamp or electric heater can show a low impedance to a carrier frequency. Therefore, a signal level can be lowered to thereby prevent correct data transmission.

SUMMARY OF THE INVENTION

Accordingly, it is an object of the present invention to provide an improved data transmission system and method for subsequently transmitting data by each of a plurality of transmission sections.

It is another object of the present invention to provide an improved data transmission system and method for subsequently transmitting data by each of a plurality of transmission sections which select received data modules by a polling system.

Briefly described, in accordance with the present invention, a data transmission method over building wiring comprises the steps of providing a plurality of transmission sections, selecting one from the plurality of transmission sections to be a data transmission source machine for providing data, transmitting the data from the data transmission source to the remaining transmission sections, relaying the data by some of the remaining transmission sections, and receiving the data by a final data transmission section.

A data transmission section to enable the method comprises data receiving means for receiving the transmitted data, relay counter means for counting the number of relaying steps of the transmitted data, and data relaying means for relaying the received data at least at the worst.

BRIEF DESCRIPTION OF THE DRAWINGS

The present invention will become more fully understood from the detailed description given hereinbelow and accompanying drawings which are given by way of illustration only, and thus are not limitative of the present invention and wherein:

FIGS. 6(a) to 6(c) show flow charts of the operation according to the present invention.

DETAILED DESCRIPTION OF THE INVENTION

Figure 1:
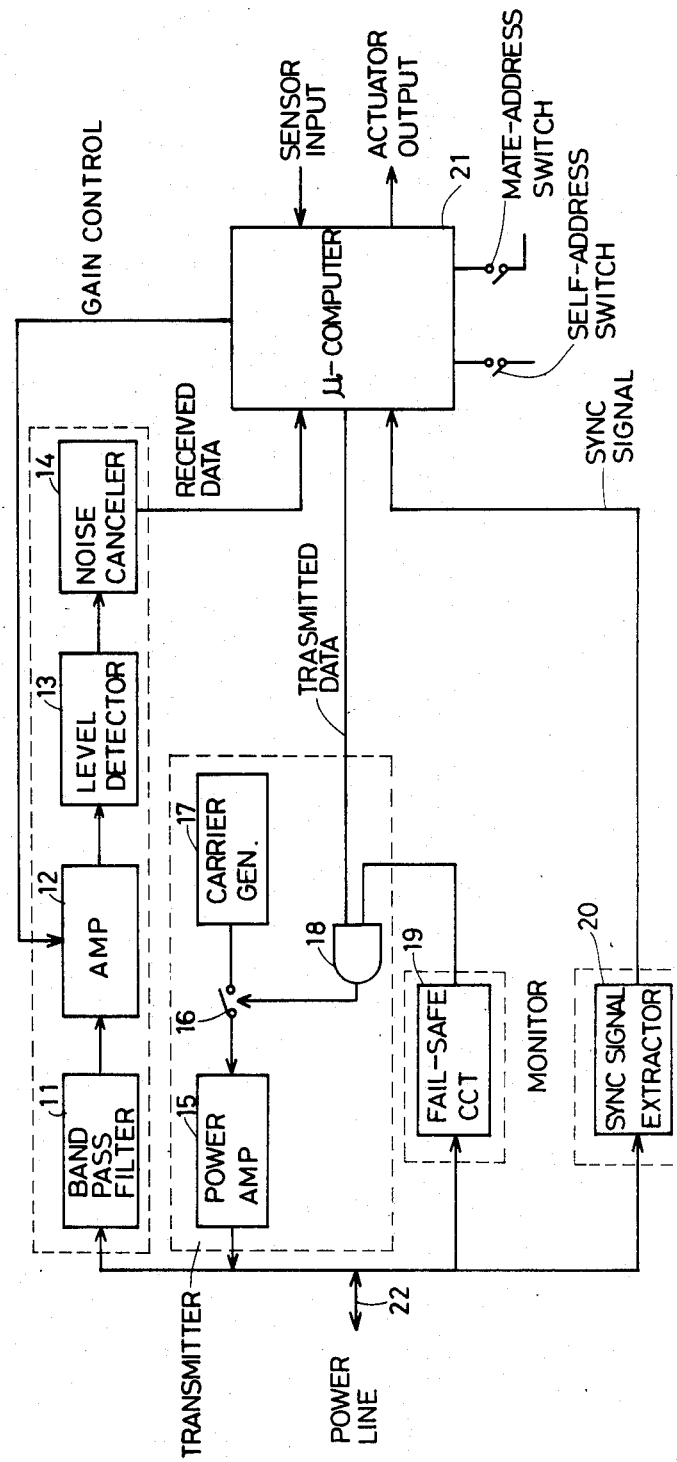
FIG. 1 shows a block diagram of a data transmission section according to the present invention.

Referring now to FIG. 1, there is illustrated a transmission section of a signal transmission system over house wiring which generally includes a band pass filter 11, an amplifier 12, a level detector 13, a noise canceller 14, a power amplifier 15, a switch 16, a carrier generator 17, a logic gate 18, a fail-safe circuit 19, a sync signal extractor 20 and a controller 21 typically formed of a one-chip microcomputer. With such arrangement, house wiring 22 carries the utility power voltage, typically 60 Hz and 100 volts, and a carrier of typically 40 KHz superimposed on the utility power voltage. Obviously, the carrier is generated by the carrier generator 17. The band pass filter 11 extracts high frequency components from the house wiring 22 and the amplifier 12 ampifies the high frequency components up to a sufficient level suitable for satisfactory working of the level detector 13. The noise canceler 14 rids the high frequency components of any random noise. Received data from the noise canceler 14 are fed to the controller 21 which is also responsive to an input from a sensor or alternatively determines whether an actuator is to be enabled. The fail-safe circuit 19 monitors to see if the controller 21 falls into a run-away state. Under a normal state of the whole system, transmitted data is fed to the power amplifier 15 via the logic gate 18 and the switch 16. The sync extractor 20 converts the sine-waveform of the power line voltage waveform into a square waveform.

Figure 2:
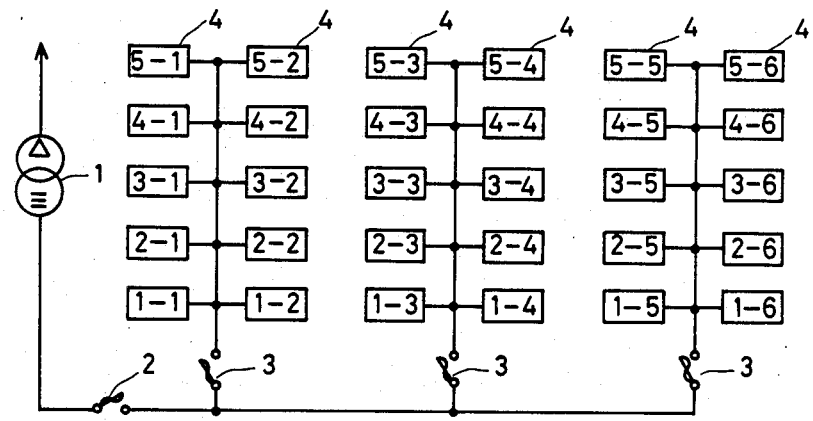
FIG. 2 shows an overall data transmission system used for the present invention.

A plurality of transmission sections 4 as shown in FIG. 1 are disposed at each of the locations 1—1 to 5-6 of FIG. 2. Both the transmission source and the many satellite sections comprises a transmission section as shown in FIG. 1.

The transmission section of FIG. 1 can transmit an output which can be received by its adjacent four-side transmission sections.

The total system of FIG. 2 comrises a transformer 1 for transferring 3-phase 6600 volt to single phase and 3-line 100 volt, a main breaker 2, sub-breakers 3.

Figure 3:
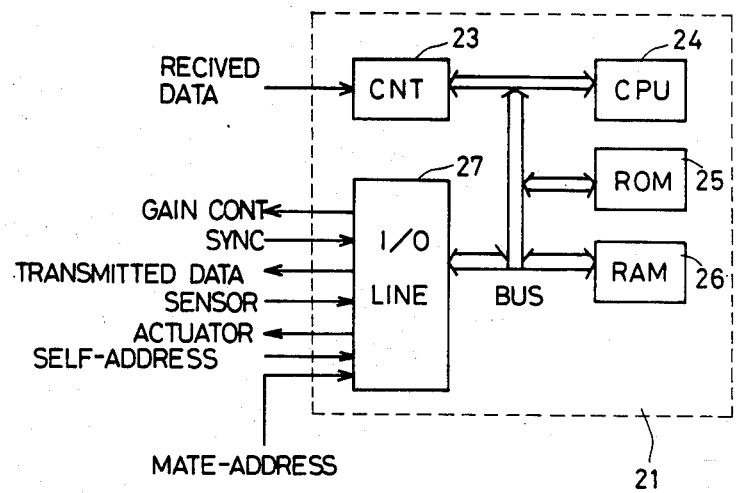
FIG. 3 shows a block diagram of a micro-computer of FIG. 1.

FIG. 3 shows a block diagram of the controller 21. The controller 21 comprises a control circuit CNT 23, a CPU 24, a ROM 25, a RAM 26 and an I/O line circuit 27. The CNT 23 receives data from a mate transmission section. A self-address switch and a mate-address switch are connected to the controller 21. The self-address switch is operated to set a self-address of a transmission section. The mate-address switch is operated to set an address of a following mate transmission section to which data is transmitted from the transmission section.

The CPU 24 of FIG. 3 detects the data from a previous mate transmission section. The received data is stored in the RAM 26 and further transmitted to the following mate-transmission section therefrom. The RAM 26 contains a relay station counter for counting the number of relaying steps for the data to detect whether the number of relaying steps for the data equals a predetermined number set in this counter. The number of relaying steps of the data in this counter is increased by the CPU 24 when one of the transmission sections receives and forwards the data. The I/O line circuit 27 inputs and outputs various signals as shown in FIG. 3.

Figure 4:
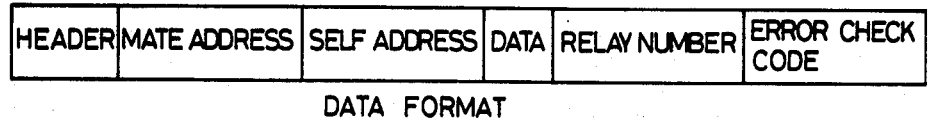
FIG. 4 shows a data format used for the present invention.
Figure 5A:
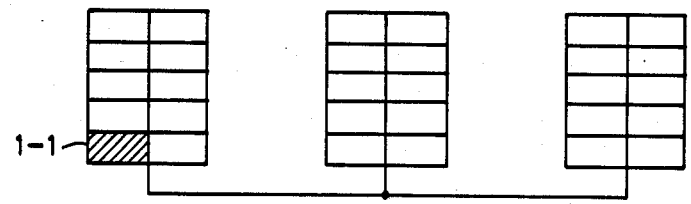
FIGS. 5(a) to 5(d) show a sequence of relaying data according to the present invention.
Figure 5B:
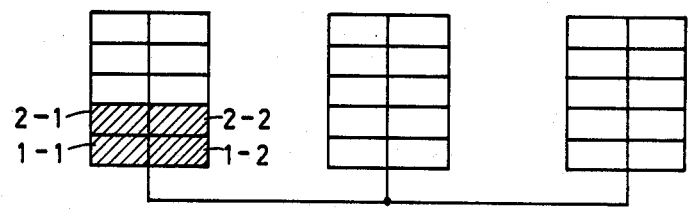
Figure 5C:
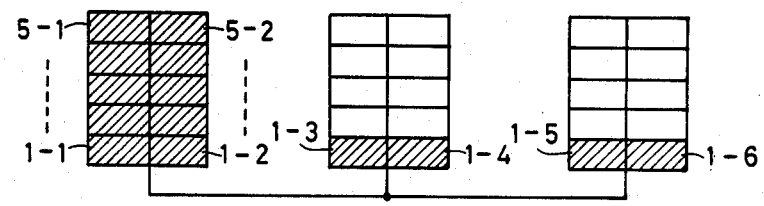
Figure 5D:
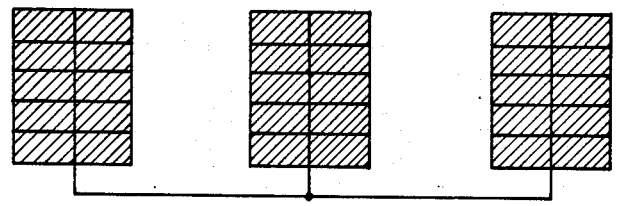

FIG. 4 shows a format of data transmitted from a first transmission section to a second transmission section according to a polling system. The data format contains parts for a header, the mate-address, the self-address, the data, the number of relaying steps for the data, and error check codes. The header indicates that data transmission begins. The mate-address and the self-address are described above. The data is the information to be transmitted. The number of relaying steps of the data is subsequently increased each time data are relayed by the transmission sections. The error check code is to check for data transmission errors.

The header requires some bits exceeding the bits for the remaining parts. When a specific symbolization system requires the bits of the header to be different from the remaining bits, the number of bits of the header can be longer than the remaining bits. The number of relaying steps of the data is represented by a binary code. When the number of relaying steps of the data is set to be 4, which is practically sufficient to relay the data, 2 bits are required to represent this number.

When only one extra bit is present in addition to the remaining above mentioned bits of the total bits, for example, the number of bits except error bits is less than 9, the error check code can be a parity check code. The error check code is detected by the CPU 24.

FIGS. 5(a) to 5(d) show a sequence of the data transmission according to the present invention. In FIGS. 5(a) to 5(d), crosshatched sections receive the data.

Figure 6A:
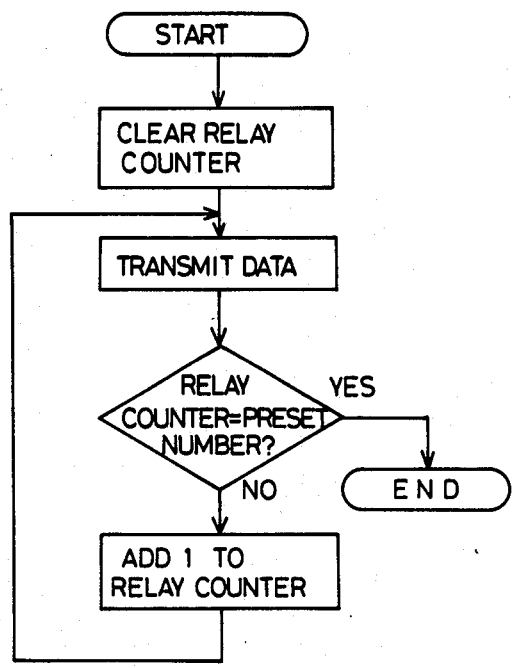
Figure 6B:
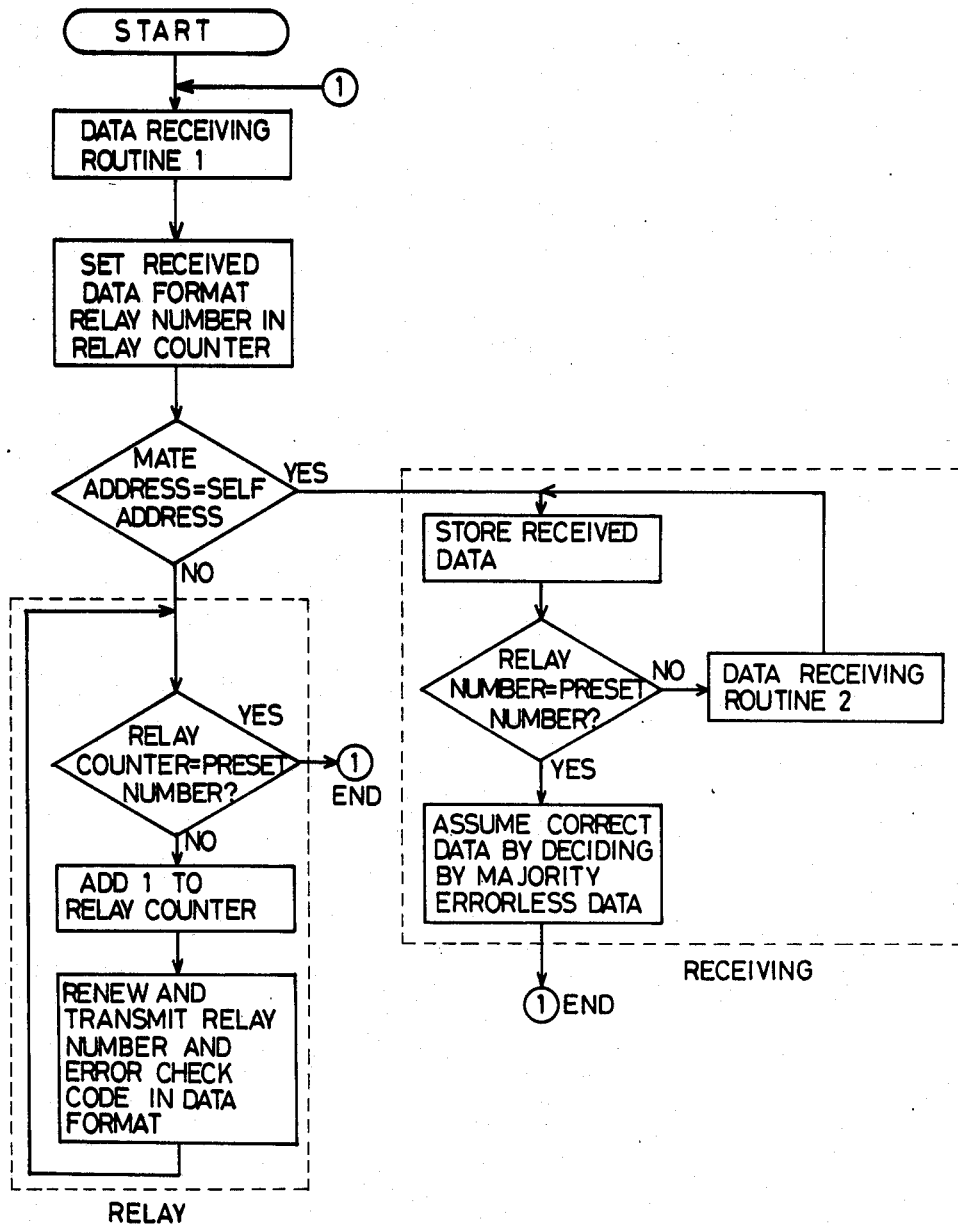

FIGS. 6(a) to 6(c) show flow charts of the operation of the present invention.

FIG. 6(a) shows a flow chart of the operation of a data transmission source machine. The relay counter of this source machine is reset. The data is transmitted until the contents of the relay counter equal the predetermined number, while the contents of the relay counter are increased by one.

The contents of the relay counter in data units transmission source machine represent the number of the data which are presently transmitted.

In the relay counter of the data transmission source machine, a predetermined number is set by which the data should be transmitted toward the satellite transmission sections.

FIG. 6(b) shows a flow chart of the operation of the satellite transmission sections for relaying or receiving the data.

A data receiving routine referred to as "Data Receiving Routine 1" is one in which a circuit operation continues before a data format set as shown in FIG. 4 is correctly received. A data receiving routine referred to as "Data Receiving Routine 2" is one in which a circuit operation continues before a data format set of FIG. 4 and operates after "Data Receiving Routine 1" and the received data except checking the error code.

First, the data receiving routine 1 is selected. When data are received by one satellite transmission section, the relay counter of this satellite transmission section contains the number of relaying steps of the transmitted data already performed. Whether a mate address equals the self-address is then detected. When equivalent, a receiving operation for only receiving the transmitted data is accomplished as shown in the steps for receiving purpose. When not equivalent, a relay operation for relaying the received data to another transmission section is accomplished as shown in the steps for relaying purpose.

The receiving operation:

After the received data is stored in the RAM 26, whether the number of relaying steps of the data equals a predetermined number set in this satellite transmission section is detected. When they are not equivalent, the data receiving routine 2 is selected. When equivalent, correct data is accepted by deciding by majority errorless data. Thus, the receiving operation ends.

The relaying operation:

It is detected whether the contents of the relay counter are equal to the predetermined number set for the relay counter. The transmitted data is relayed by the predetermined number set for the relay counter in one satellite transmission section. When they are equivalent, the relaying operation ends. When they are not equivalent, the contents of the relay counter are increased by one. Further, the number of relaying steps of the data in the data format as shown in FIG. 4 is also increased by one and the error check code of FIG. 4 is renewed. Then, the received data is transmitted.

FIG. 6(c) shows a flow chart of the data receiving routines 1 and 2.

The above description is directed to a time-sharing multiplex system. A frequency-divided multiplex system can replace the time-sharing multiplex system.

In a central monitoring system comprising only one master machine and many slave machines for intercommunicating data between the master machine and the slave machines, the self-address in the data format of FIG. 4 can be omitted when the module address is different between the master machine and the slave machines.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A method of transmitting a data message from a selected transmitting one of a plurality of transmission sections to a selected receiving one of said transmission sections wherein each of said transmission sections is identified by a self address and said selected receiving one of said transmission sections is identified by a final data transmission address in said data message, said method comprising:
    (a) transmitting said data message from said selected transmitting one of said plurality of transmission sections to at least one adjacently disposed one of said plurality of transmission sections;
    (b) said adjacently disposed one of said plurality of transmission sections comparing its said self address to said final data transmission address, receiving said data message if there is a coincidence thereof, and relaying said data message to at least one of said plurality of transmission sections adjacently disposed thereto if there is no coincidence;
    repeating step (b) until a said coincidence is detected;
    wherein said data message includes a relay number indicative of a number of steps of relaying which have been performed;
    wherein said transmission sections include a relay counter and a predetermined relay count;
    said step of relaying including the steps of, setting said relay counter of said adjacently disposed one of said plurality of transmission sections to said relay number;

comparing said relay counter to said predetermined relay count;

incrementing said relay number included in said data message prior to relay of said data message; and completing said step of relaying when said relay counter equals said predetermined relay count.

2. The method of claim 1 wherein said step of transmitting transmits said data message to all adjacent ones of said plurality of transmission stations.

3. The method of claim 1 wherein said step of receiving includes steps of, comparing said relay number to said predetermined relay count; and checking for an error if said relay number does not equal said predetermined relay count.

* * * * *